(12) United States Patent
Deans et al.

(10) Patent No.: US 6,237,906 B1
(45) Date of Patent: May 29, 2001

(54) BATTERY JIG FOR FACILITATING THE ELECTRICAL CONNECTION OF A LINE OF DRY CELL BATTERIES

(76) Inventors: Robin W. Deans, 148 Pomona Ave., Unit 3, Long Beach, CA (US) 90803; Chris D. Allec, 9280 Big Ridge Rd., Riverside, CA (US) 92509

( * ) Notice: Subject to any disclaimer, the term of this patent is extended or adjusted under 35 U.S.C. 154(b) by 0 days.

(21) Appl. No.: 09/476,819

(22) Filed: Jan. 3, 2000

(51) Int. Cl.[7] ....................................................... B25B 1/20

(52) U.S. Cl. ............................. 269/43; 269/903; 29/281.1

(58) Field of Search ............................... 269/43, 249, 703, 269/143; 29/281.1

(56) References Cited

U.S. PATENT DOCUMENTS

| | | | | |
|---|---|---|---|---|
| 359,833 | * | 3/1887 | Basinger | 269/249 |
| 1,781,997 | * | 11/1930 | Brezowski | 269/249 |
| 3,312,460 | * | 4/1967 | Kaufman | 269/43 |
| 4,341,375 | * | 7/1982 | Romanin | 269/43 |

* cited by examiner

Primary Examiner—Josheph J. Hail, III
Assistant Examiner—Lee Wilson
(74) Attorney, Agent, or Firm—Edgar W. Averill, Jr.

(57) ABSTRACT

A battery jig for facilitating the soldering of battery bars between adjacent pairs of batteries held in a line. The group of batteries is used to power small electrical devices, such as racing cars. The frame has a front and a back and sides which secure the batteries in a side by side relationship. A spring loaded arm may be positioned between the batteries to hold down a battery bar so that it may be soldered to adjacent terminals.

15 Claims, 2 Drawing Sheets

BATTERY JIG FOR FACILITATING THE ELECTRICAL CONNECTION OF A LINE OF DRY CELL BATTERIES

BACKGROUND OF THE INVENTION

The field of the invention is the electrical connection of dry cell batteries and the invention relates more particularly to devices which assist in the preparation of battery packs composed of multiple cells in differing configurations which will hold a number of batteries together electrically connected normally in series but possibly in parallel or partially in parallel and partially in series to provide a source of electricity for a battery powered device.

Several battery jigs have recently been developed to assist in the soldering of a group of batteries in a line. One such device is shown in Xtreme R/C Cars, Issue 3.9 June–July, 1998, at Page 68–69. In this device the batteries are arranged by standing them up in a tray alternating polarity on the top positive/negative. Two side braces must be carefully held to sandwich the cells with nothing to locat them or keep them square, after which a Velcro strap is wrapped around the two side braces to hold the cells together. Care must be taken to keep the cells from falling out until they are placed in the bottom tray. The photograph in the center bottom of Page 68 shows a user soldering one end of a battery bar to a battery. After battery bars are placed on one surface, then the half connected cells are flipped over and the other set of battery bars are soldered to complete the series connection. As stated in the article, the job of holding the two pressure plates while placing the strap around the plates ". . . takes some dexterity, to say the least." (Column 1, page 69).

A second battery jig is shown in Xtreme R/C Cars, Issue 2.9 May–June, 1997, at Pages 42–43. In this device the batteries are placed in a battery jig. The battery bar is held between two adjacent batteries by another object, such as a pair of needle nose plyers, which is best performed by a second person. Then, as stated in step 6 on Page 42, one "gently slides the pack out of the jig, then the pack is turned over and the user slides it back into the jig and repeats the soldering step. Also note in Step 2, the battery bars themselves are also pre-tinned. There are several shortcomings with this approach: One is that the batteries are not held tightly together before they are soldered together. Also, only half of the batteries have been interconnected in Step 5. In other words, three bars have been soldered on as shown in the bottom of the batteries in Step 8 and, thus, there are three separate units which must be gently slid in and out of the jig.

Any commercially provided battery packs have been mass produced by welding thin conductors between adjacent batteries and then holding the groups of batteries together in heat-shrink tubing. While this method permits mass production, it has some serious limitations in electrical resistance due to the nature of the thin conductors soldered between adjacent batteries.

BRIEF SUMMARY OF THE INVENTION

An object of the present invention is to provide a battery jig which permits the user to easily connect adjacent batteries by soldering a battery bar between them and also permits the adhering of the sides of adjacent batteries together by glue.

The present invention is for a battery jig for facilitating the soldering of a battery bar between adjacent pairs of batteries of a line of dry cell batteries which are positioned with alternating positive and negative terminals facing in the same direction. The jig comprises a main frame which has two ends and a back and a front piece. The frame also provides means for holding the top portions and the bottom portions of the batteries in a straight line which not only hold the batteries parallel and square, but also accurately positions them in a straight line.

The frame preferably has a glue application opening 25 so that the user can apply glue between adjacent batteries to further assist in holding the resulting battery stick together as one unit. This also permits the user to position the batteries so that they face in a desired orientation for aesthetic purposes. Also, the battery jig preferably has at least one flexible foam spacer 26 which permits the jig to be used for a different number of batteries. It also helps to hold the batteries in a touching relationship while applying pressure to square up the cells against the end of the frame. Because the spacers are flexible, they press against the straight line of batteries 28 so that the beginning of the line 29 presses against first end 12 and the end of the line 30 presses against foam spacer 27. Battery jig 10 also has means for aligning the tops and bottoms of the battery. This is accomplished by an inwardly directed overhang 31 so that when the batteries are placed against the back portion 14, they are held so they cannot move upwardly as viewed in FIG. 1. Similarly, as shown in FIG. 5, an inwardly directed overhang 32 is formed in back portion 14 to hold the bottoms of the batteries in line. The battery jig also permits the user to solder wires or end lugs at the two ends of the group of batteries for connection to an appropriate electrical connector.

BRIEF DESCRIPTION OF THE DRAWINGS

FIG. 4 is a perspective view of the biased arm of the battery jig of FIG. 1.

FIG. 5 is a cross-sectional view taken along line 5—5 of FIG. 1.

DESCRIPTION OF THE PREFERRED EMBODIMENTS

Figure 1:
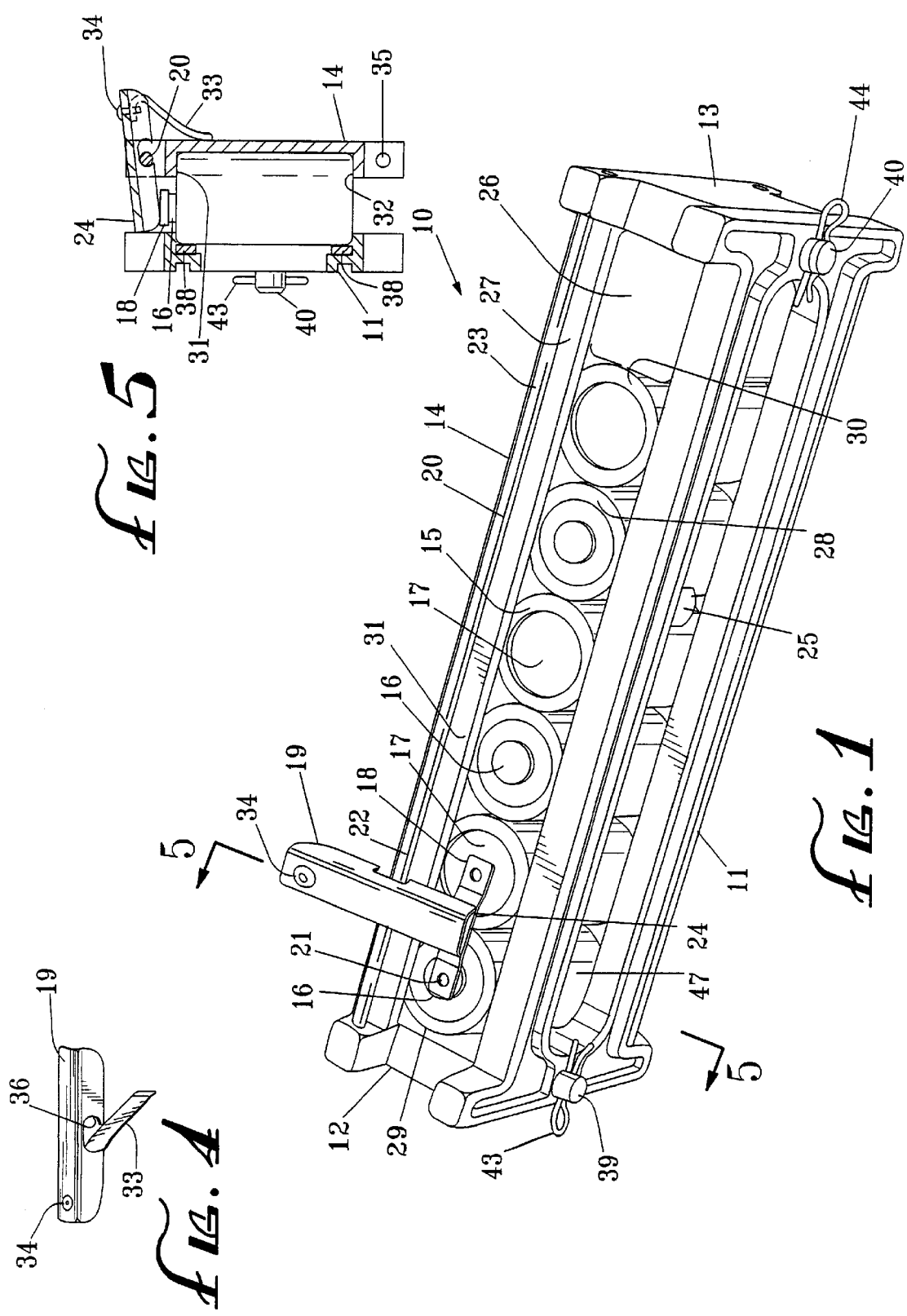
FIG. 1 is a perspective view showing the top, front and one end of the battery jig of the present invention.

The battery jig of the present invention is shown in perspective view in FIG. 1 and indicated generally by reference character 10. Battery jig 10 has a front portion 11, a first end 12, a second end 13 and a back portion 14. The jig has a plurality of dry cell batteries 15 which are oriented in opposite polarity orientation so that a positive terminal 16 is adjacent each negative terminal 17. In that way a battery bar 18 may be soldered between a negative terminal 17 and a positive terminal 16.

A biased arm 19 is slidingly held by a rod 20 positioned parallel to the back portion 14 of the frame. Biased arm 19 holds battery bar 18 in a way that the two ends of the battery bar 21 and 22 are exposed so that they may be touched with a soldering iron. In practice, typically the terminals of the batteries are tinned with a thin layer of solder to facilitate the soldering of a battery bar such as battery bar 18 to the terminals of the adjacent battery. Because the biased arm 19 is securely holding the battery bar against the two batteries, the user now has a free hand to hold a length of solder so it is not necessary to hold the battery bar down with needle nose plyers or another tool as set forth in the products discussed above. Three battery bars would be connected to the terminals visible in FIG. 1.

It is preferable that the biased arm 19 be positioned at various desired locations. As shown in FIG. 1 the biased arm 19 should be positionable between each of the three pairs of batteries shown in FIG. 1. The positioning of the batteries is, of course, dependent upon the number of batteries and the desired connection orientation. The moving of the biased arm 19 is accomplished by making the biased arm 19 slidable by connecting it to a rod 23. Alternatively, it can be removed and replaced at a desired location along the bar. This is accomplished by making the biased arm 19 slidable by connecting it to a rod 23. The biased arm has a pressure foot 24 which actually contacts battery bar 18.

The frame preferably has a glue application opening 25 so that the user can apply glue between adjacent batteries to further assist in holding the resulting battery stick together as one unit. This also permits the user to position the batteries so that they face in a desired orientation for aesthetic purposes. Also, the battery jig preferably has at least one flexible foam spacer 26 which permits the jig to be used for a different number of batteries. It also helps to hold the batteries in a touching relationship while applying pressure to square up the cells against the end of the frame. Because the spacers are flexible, they press against the straight line of batteries 28 so that the beginning of the line 29 presses against first end 12 and the end of the line 30 presses against foam spacer 27. Battery jig 10 also has means for aligning the tops and bottoms of the battery. This is accomplished by an inwardly overhang 31 so that when the batteries are placed against the back portion 14, they are held so they cannot move upwardly as viewed in FIG. 1. Similarly, as shown in FIG. 5, an inwardly directed overhang 32 is formed in back portion 14 to hold the bottoms of the batteries in line.

Figure 2:
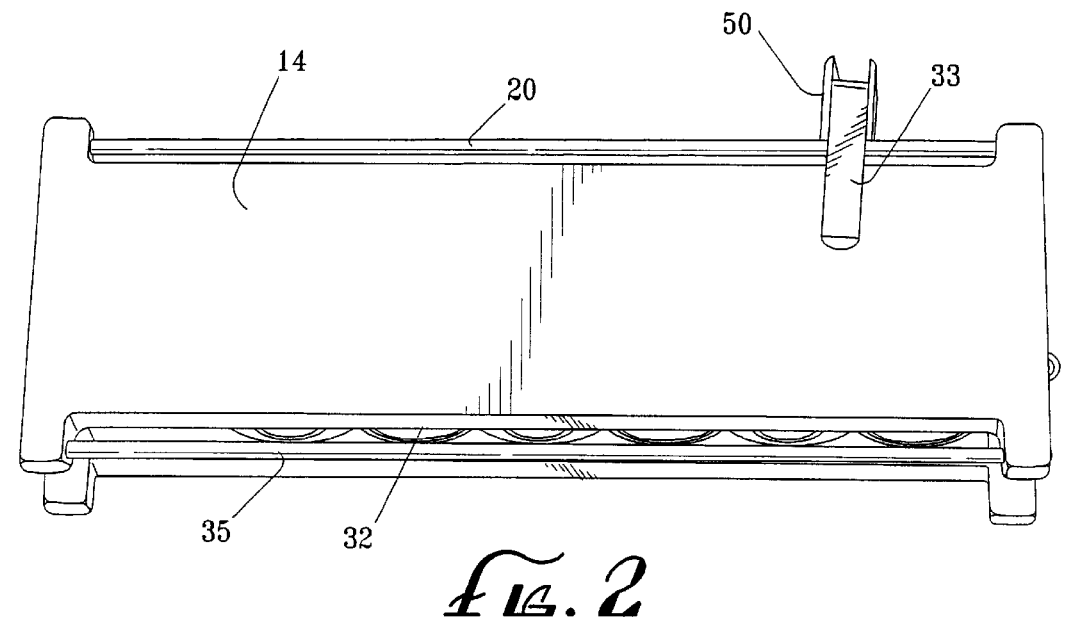
FIG. 2 is a perspective view showing the back and bottom of the battery jig of FIG. 1.
Figure 3:
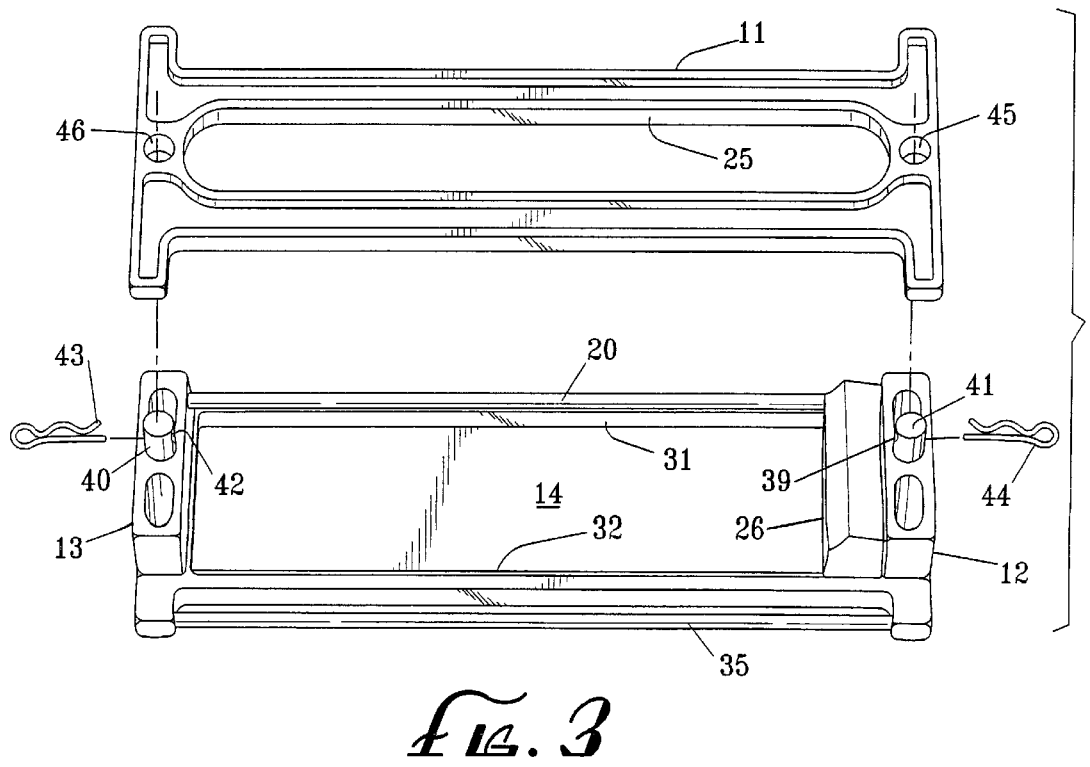
FIG. 3 is an exploded perspective view showing the front side of the back of the battery jig of FIG. 1 and the front side of the front portion thereof.

The details of construction of biased arm 19 are shown best by viewing FIGS. 5, 4, 2, and 1. In FIG. 5 it can be seen that arm 19 has a leaf spring 33 which is held by a spring holding rivet 34 to the biased arm 19. Arm 19 can alternatively be injection molded from a polymer. Leaf spring 33 also contacts the back surface of back portion 14 as shown in FIG. 2 and is thus permitted to slide along upper rod 20. Similarly, a lower rod 35 is held below the back portion 14 and permits the user to invert the jig while leaving the cells securely held in the jig and connect battery bars between adjacent portions so that the resulting line of batteries is connected in series.

Returning to FIG. 4, it can be seen that a slot 36 is formed in biased arm 19 and leaf spring 33 holds the end of the slot 36 against one of the rods 20 or 35, and yet, the opening in the base of the slot 36 permits the arm to be removed from one of the rods and inserted on the other rod.

Another feature of the jig is shown in FIG. 5 where there are two strips of rubber 38 on the inner surface of front portion 11 which press against the sides of the battery and hold them against the back portion 14.

The front 11 is removably held against the ends 12 and 13 by pegs 39 and 40, each of which have holes therethrough for the insertion of spring clips 43 and 44. Pegs 39 and 40 pass through holes 45 and 46 in removable front portion 11 after which the spring clips are inserted.

The glue application opening 25 exposes the fronts 47 of the batteries 15 for the insertion of glue as stated above. It would, of course, also be possible to provide an opening in the rear, if desired. While the front is shown as removable, it is also contemplated that the back, a top or bottom or an end be removable. It is only possible that one of the surfaces be operable. That is, it can, of course, be hinged instead of being removed.

The result is a battery jig of great flexibility. It is capable of holding different numbers of batteries and of not only soldering the terminals of batteries together, but also permits the gluing of adjacent batteries together. The battery jig should be fabricated from a strong material, and glass reinforced nylon has been found appropriate. After the batteries in the jig have been connected by battery bars, an electrical connection can be made at each end. The batteries are then recharged as is conventional. Typically, 1.2 volt NiCad or nickel metal-hydride batteries are used which are capable of providing 1200–3000 milliamps when property connected, which is possible with the jig of the present invention. While the term "soldering" is used in the claims, this term is intended to include welding or any other means of providing a physical and electrical connection. Likewise, "Soldering iron" is, of course, intended to include analogous tools for any new types of electrical technology which may be developed. While the term "dry cell" is used herein, it is, of course, intended to over other styles of batteries which may not technically be called "dry cells."

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A battery jig for facilitating the soldering of a battery bar between adjacent pairs of batteries of a plurality of batteries, said jig comprising:

a frame for removably holding a plurality of batteries in a desired adjacent alignment, said frame having two ends, a front portion, a back portion, and means for holding top portions and bottom portions of said plurality of batteries to align the tops and bottoms thereof;

a biased arm held by said frame for pressing said battery bar against adjacent terminals to be soldered of two adjacent batteries while said battery bar to be soldered is free for contact by a soldering iron positioned over a battery terminal as said battery bar is soldered to said terminal; and wherein said biased arm is affixable to said frame at a plurality of locations.

2. The battery jig of claim 1 wherein said biased arm is slidable along said frame.

3. The battery jig of claim 2 wherein said biased arm is supported by a rod positioned parallel to said back portion of said frame and further has a spring which contacts one of said front portion and said back portion of said frame.

4. The battery jig of claim 3 wherein said spring is a leaf spring which contacts said arm and said back portion of said frame.

5. The battery jig of claim 1 wherein said frame supports a straight line of adjacent batteries at a beginning and at an end of said line, at each front of each battery and at each back of each battery, at each bottom of each battery and each top of each battery which frame also has an opening at each top of each battery and at each bottom of each battery.

6. The battery jig of claim 5 wherein a terminal area of each battery is exposed at a top and a bottom of each battery and wherein said means held by said frame for pressing a battery bar against the terminals of two adjacent batteries is positionable at either a top or a bottom of said frame.

7. A battery jig for holding at least two dry cell batteries in a straight line, said jig comprising:

a frame having a front, a back, a first end and a second end, at least one of said front and said back having an inwardly directed overhang to hold tops of the batteries and at least one of said front and said back having an inwardly directed overhang to hold the bottoms of the batteries in alignment, said back having a flat area on a back side thereof near a top edge and a bottom edge; and a biased arm having a pressure foot, said biased arm being attachable to said frame so that said pressure foot is positioned to hold a battery bar against two terminals of adjacent ones of said at least two cylindrical, dry cell batteries said biased arm being hingable so that its pressure foot can move downwardly against the battery bar and said biased arm including a leaf spring having one end urging said pressure foot in a direction of the battery bar and its other end pushing inwardly against said back.

8. The battery jig of claim 7 wherein a rod is held above the back of said frame and said biased arm has a slot which fits over said rod thereby holding said biased arm in a pivotable and slidable manner on said frame.

9. The battery jig of claim 8 wherein a second rod is held below the back of said frame for slidably holding said biased arm.

10. The battery jig of claim 7 wherein said front is removable from said first end and said second end.

11. The battery jig of claim 10 further including at least one flexible foam spacer held against at least one of a front and a back of said straight line of said at least two cylindrical dry cell batteries and against an end of said frame so that said batteries are pressing against one another.

12. The battery jig of claim 7 wherein the front of said frame has a glue application opening through said front.

13. The battery jig of claim 7 wherein at least one of said front and said back of said frame has an area of sponge pressing against sides of the line of at least two dry cell batteries.

14. The battery jig of claim 13 wherein the front of said frame is removable from a remaining portion of said frame for the placement and removal of batteries.

15. The battery jig of claim 14 wherein said front of said frame is attachable with spring clips.

* * * * *